United States Patent [19]

Reatherford et al.

[11] Patent Number: 5,653,377
[45] Date of Patent: Aug. 5, 1997

[54] FRICTION WELDED VALVE SEATS

[75] Inventors: Larry V. Reatherford, Clarkston; Stephen G. Russ, Canton, both of Mich.

[73] Assignee: Ford Motor Company, Dearborn, Mich.

[21] Appl. No.: 539,447

[22] Filed: Oct. 6, 1995

[51] Int. Cl.⁶ .................................................. B23K 20/12
[52] U.S. Cl. ............................ 228/114.5; 29/888.44
[58] Field of Search ............................. 29/888.4, 888.44, 29/888.46, 888.06, 890.122; 228/114.5

[56] References Cited

U.S. PATENT DOCUMENTS

| | | | |
|---|---|---|---|
| 3,478,411 | 11/1969 | Goloff et al. | 29/888.44 |
| 4,079,491 | 3/1978 | Richardson | 29/890.122 |

FOREIGN PATENT DOCUMENTS

| | | | |
|---|---|---|---|
| 6-58116 | 3/1994 | Japan | 29/888.44 |

*Primary Examiner*—P. Austin Bradley
*Assistant Examiner*—Jeffrey T. Knapp
*Attorney, Agent, or Firm*—Joseph W. Malleck

[57] ABSTRACT

Method of attaching an insert to a valve seat location of an engine involves forming an engine valve seat location with a circular conical face surface constituted of a light metal; forming an insert with a circular conical bonding surface for mating with the face surface, the bonding surface being constituted of a metal dissimilar to the light metal and having a higher hardness and a higher melting temperature than the light metal of the face surface; aligning the axes of the face surface and bonding surface and gradually rotationally driving the insert into the valve seat with sufficient pressure and for a controlled period of time frictionally melt or plasticize a film of the face surface; and thereafter ceasing the rotational driving while holding the surfaces together with sufficient forging pressure and for a period of time to allow the melted film to recrystallize and create a metallurgical bond between the surfaces.

11 Claims, 3 Drawing Sheets

# FRICTION WELDED VALVE SEATS

BACKGROUND OF THE INVENTION

1. Technical Field

This invention relates to the technology of attaching a wear resistant valve seat material to a light metal automotive engine head and more particularly to installing valve seat inserts rapidly and economically to aluminum cylinder heads.

2. Discussion of the Prior Art

Aluminum automobile cylinder heads are typically designed to receive pressed-in valve seat inserts of iron based material. The insert must be of substantial cross-sectional size to provide durability, strength and to retain the press fit. Optimal port geometry must be compromised leaving a smaller inside port diameter and cooling passage location, adjacent the seat, must be compromised Moreover, the greater size of the interface between the insert and cylinder head retards the cooling rate of the valve and seat area.

To eliminate pressed-in seat inserts, laser cladding of valve seats has been tried to obtain some increase in engine performance such as horsepower, torque and volumetric efficiency. Unfortunately laser cladding is an expensive technique that does not fit readily with traditional manufacturing facilities. Inertia welding of valve seats has also been tried in exotic applications for liquid metal breeder reactors where cost is not a factor; the insert (usually of chrome-cobalt-tungsten material) and a separate stainless steel weldment are attached to a rotary driver before inertially welding the weldment to a stainless steel valve seat. The same material is friction welded to the material (stainless steel to stainless steel). The driver is then machined away and the insert is shaped by machining (see U.S. Pat. No. 4,079,491). Obviously such technique is too costly and thermal conductivity, through layers of an insert and weldmerit to the head and coolant, is poor; the mass of the insert is too large to be effective for thermal conduction.

SUMMARY OF THE INVENTION

It is an object of this invention to provide a more cost effective method of installing a thermally stable and conductive insert in an aluminum cylinder head, the insert allowing larger ports and improved cooling passage location. To this end the method of this invention comprises the steps of: forming an engine valve seat location with a circular conical face surface constituted of a light metal; forming an insert with a circular conical bonding surface for mating with such face surface, the bonding surface being constituted of a metal dissimilar to said light metal and having a higher hardness and a higher melting temperature than said light metal of said face surface; aligning the axes of said face surface and bonding surface and gradually rotationally driving said insert into said valve seat with sufficient pressure and for a controlled time period to frictionally melt or plasticize a film of said face surface; and thereafter ceasing said rotational driving while holding said surfaces together with sufficient forging pressure to allow the melted film to recrystallize and create a metallurgical bond between said faces.

The insert is preferably selected from sintered powder metal of high temperature nickel or steel alloys. The pressure applied during frictional contact is preferably about 6,000–11,000 psi for at the interface 0.8–1.5 seconds and the pressure during recrystallization is about 14,000–18,000 psi at the interface for at least 2 seconds.

DETAILED DESCRIPTION AND BEST MODE

Figure 1:
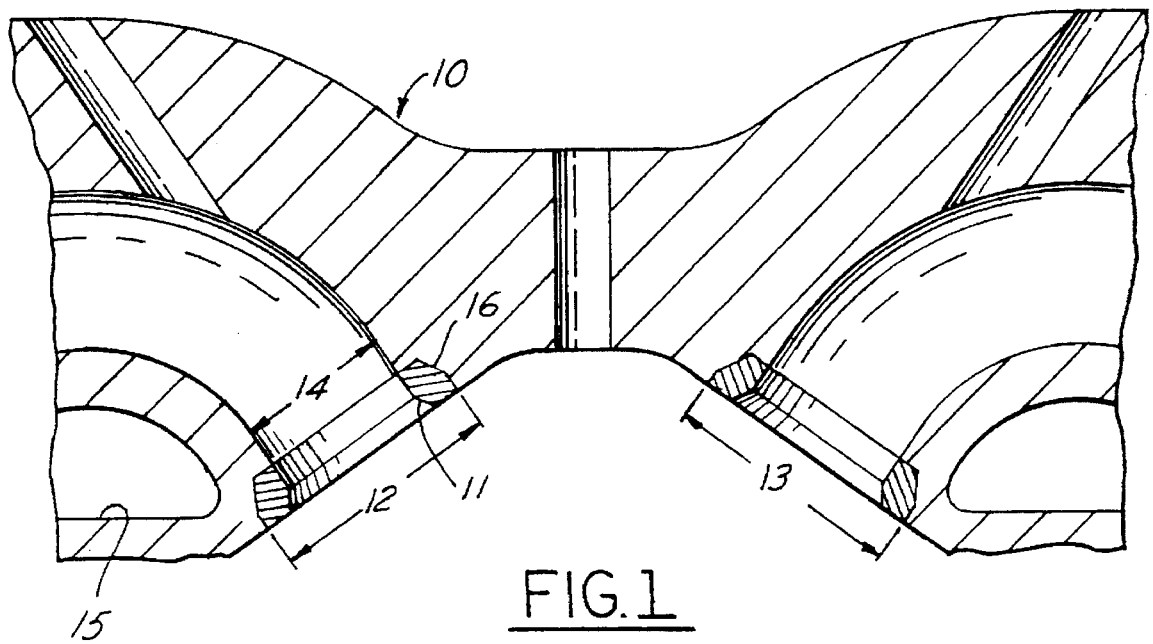
FIG. 1 is a sectional view of a typical prior art engine head with pressed-in valve seat inserts.

As shown in FIG. 1, an aluminum automobile cylinder head 10 is typically designed to receive pressed-in valve seat inserts 11 after a rigorous machining operation. Such insert must be of substantial size (large outside diameter 12 and small inside diameter 13) to tolerate the press fit and provide durability and strength. This compromises the optimal (i) internal port diameter 14 which must be smaller and (ii) the location of the surrounding cooling passage 15 which must be more remote to accommodate the larger outside diameter 12 of the insert 11. The lack of a metallurgical bond at 16 between the insert 11 and engine head 10 further tends to retard the cooling rate of the valve and the seat area.

The method of this invention requires initially that the engine valve seat location 17 be formed with a face surface 18 as a surface of revolution, i.e., a circular conical shape; the face surface 18 is constituted of a light metal, such as aluminum (i.e., 319 aluminum, 5.6–6.5% by weight Si, 3–4% Cup 1% Fe, 1% Zn, 0.5% Mn) or magnesium based, and is prepared by only a light machining of the seat location 17 to finish the as-cast shape. The light machined face surface 18 will have a surface roughness of about 32 microinches. The thermal conductivity of the light metal will be about 109 w/m°C.$^2$ for aluminum and 90 w/m°C.$^2$ for magnesium; the melting temperature of aluminum is about 600° C. and 580° C. for magnesium. The hardness of aluminum will be about RB 40–70 and for magnesium about RB 30–60.

The insert 19 is formed with an external bonding surface 20 for mating with the face surface 18; surface 20 is a surface of revolution, i.e., a circular conical configuration. The bonding surface and insert is constituted of a dissimilar metal from that of the engine head and has a higher hardness and a higher melting temperature (at least by 1500° F.) than the seat face surface. The insert is advantageously formed as a sintered powder metal body that is porous. The metal of the insert, in order to have high thermal stability (up to a temperature of 800° C.) is selected from high performance steel alloys, such as or *Brisco Steel* (2.0–20% Cu, 0.9–1.3% C, 0.3–0.8% Mo, balance Fe) or similar steels. If powdered materials are not used, compositions such as *Monel* K500 (65% Ni:by wt., 30% Cu, 2% Fe, 3% Al+Ti), *Inconel* X750 (73% Ni, 16% Cr, 7% Fe, 2.5% Ti, 1% Al, 1% Nb), and such as Molybdemum steel (0.55–0.9% C, 0.65–0.85% Mo, 0.2–0.45% Mn, 1.5–2.5% Ni, 0.1–0.2% Mg, balance Fe), Chrome/Magnanese/Nickel Steel (1.5–2.0% C, 4.0–6.5% Cr, 1.0–2.7% Mn, 2.5–4.0% Cu, 1.6–2.4% Ni, 0.3–0.45% Mo, 0.1–0.2% Mg, balance Fe), may be used. The hardness of these insert materials will exceed the hardness of the engine head face surface material by at least 250 Knoop, and most importantly have a melting temperature which is in the range of 1500° C. The sintered density of the insert will be in the range of 6.4–8.0 grams/cm$^3$, the hardness will have a range of 45–160 HRB; the microhardness will range from 400–850 knoop; and the steel microstructure will comprise one or more of pearlite, bainitc, ferrite, martensite and anstenite. The surface roughness of the bonding surface is about 32 Mu. The total mass of the insert is in the range of 6–17 grams.

Figure 3:
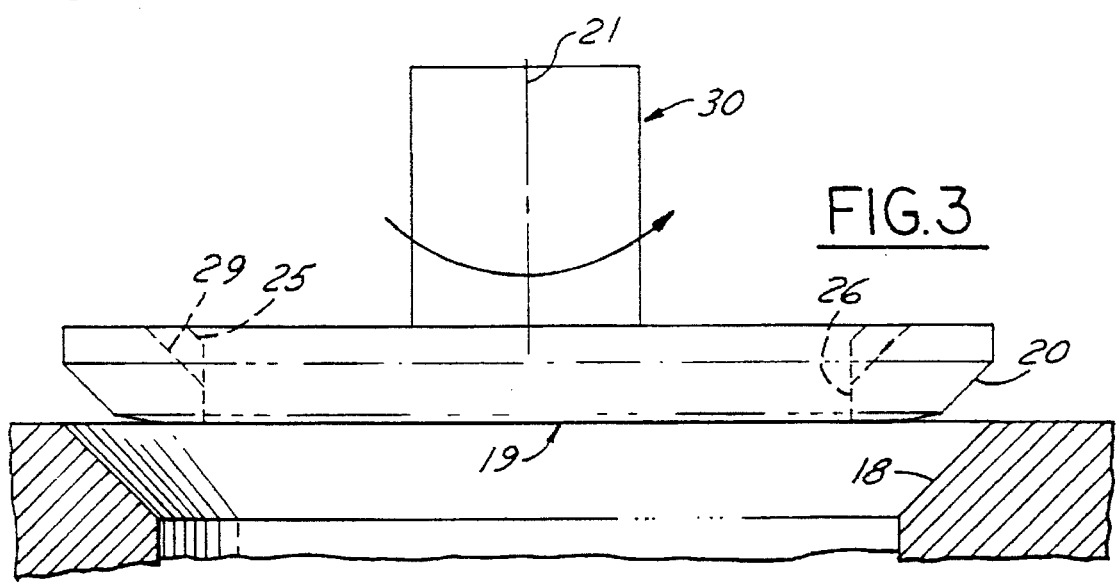
FIG. 3 is an enlarged schematic central sectional elevational view of one insert being brought into frictional engagement during rotary driving thereof, effective to create a melted or plasticized film on the face surface of the seat.
Figure 4:
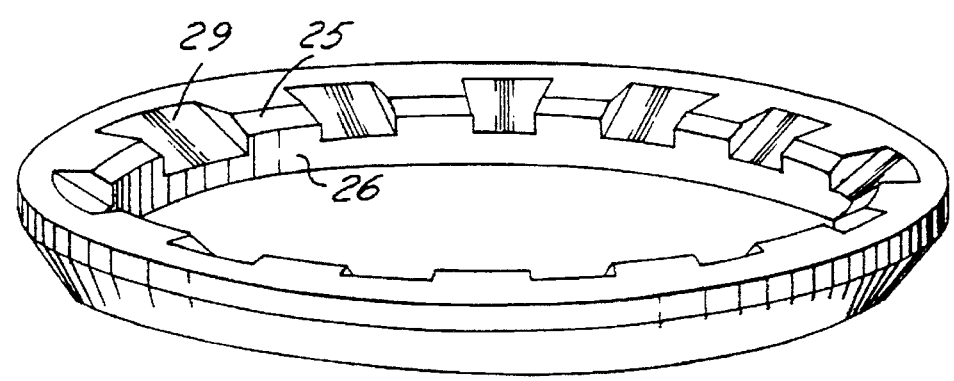
FIG. 4 is an enlarged perspective view of an insert.
Figure 2:
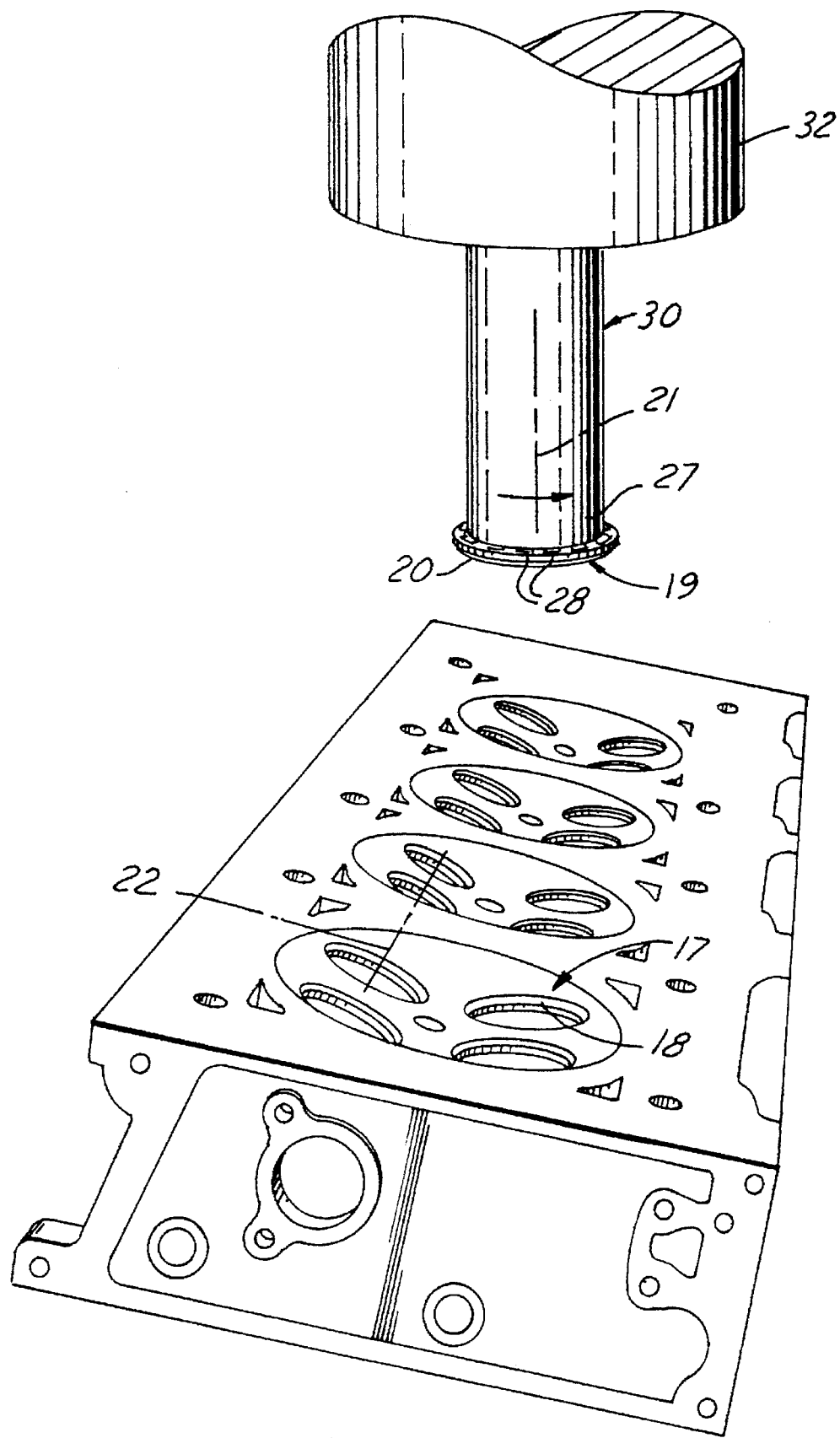
FIG. 2 is a perspective view of an aluminum engine cylinder head with defined valve seat locations and a friction welding assembly ready to carry out friction welding of an insert supported on the end of a rotary driven arbor.

The insert 19 is frictionally welded to the face surface 18 of the valve seat location by aligning the axes (21 and 22 of the surfaces 20 and 18 and gradually rotationally driving the insert surface 20 into the face surface 18 with sufficient pressure and for a controlled period of time to frictionally melt or plasticize a film of the seat face surface. It is also possible to drivingly rotate the seat face surface, if on a smaller component, relative to the insert. The driving, as shown in FIGS. 3–4, is effected by use of a plurality of nubs 25 performed on the upper interior surface 26 of the insert; the nubs are spaced regular annularly about surface 26. The end 27 of the driving arbor 30 is provided with annularly arranged teeth 28 which mesh with the spaces 29 between the nubs 25 of the insert. When the insert is meshed and gripped by the arbor 30, it is gradually lowered concentrically, while rotating, against the face surface 18. The arbor 30 is preferably rotated at a speed of 2500–3000 rpm. The friction pressure employed during the driving interengagement may be created by use of a hydraulic cylinder that imposes a force acting on the load cylinder of the welder chuck assembly 32. For example, if the load cylinder cross-sectional area is 17 square inches, then the load applied to the face surface 18 is about 6,400 pounds. The pressure on the face surface is preferably 6,000–11,000 psi. If the contact area of the face surface 18 is about 0.63 in$^2$, then the pressure on the face surface will be about 10,800 pounds. This pressure is held for about 0.8–1.5 seconds to generate a melted or plasticized film 33 on the face surface 18.

Figure 5:
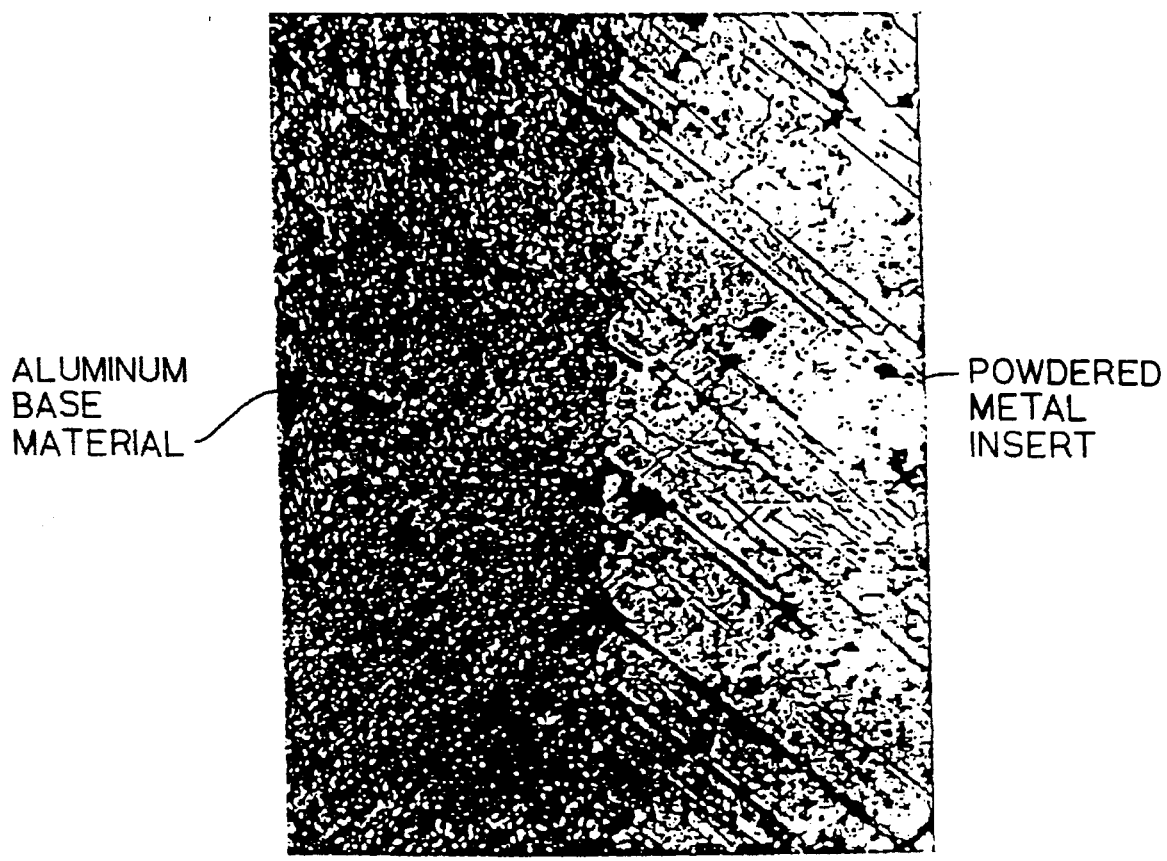
FIG. 5 is a scanning electron microphoto of the completed friction weld zone of one engine head assembly (200×) showing the metallurgical bond.

The driving rotation must be stopped quickly and immediately after such film 33 is generated. After cessation of rotation, the bonding surface and face surface are held together with a forging pressure for a period of time to allow the film 33 to recrystallize and create a metallurgical bond between such surfaces as shown in FIG. 5. The forging pressure is preferably about 14,000–18,000 psi at the interface. The force at the load cylinder may be about 600 psi which translates into a load of about 16,000 pounds for the area of about 0.63 in$^2$. This forging pressure is held for at least 2 seconds.

FIG. 5 shows the intimate metallurgical bond that is achieved with the friction welding technique of this invention.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. Method of attaching an insert of dissimilar material to a valve seat location face surface of an aluminum based engine cylinder head, comprising:

(a) shaping an insert with a bonding surface mateable with said face surface and with a plurality of gripping nubs located away from said bonding surface, said insert being comprised of a sintered powder metal material having a higher melting temperature than the material of said face surface;

(b) rotationally driving said insert through said gripping nubs at a high speed while gradually bringing said bonding surface into frictional contact with said face surface with sufficient force to melt or plasticize a film of said face surface; and (c) ceasing rotational driving while holding said faces together with sufficient pressure to assure a metallurgical bond therebetween.

2. Method of attaching an insert to a valve seat location in an engine, comprising:

(a) forming an engine valve seat location with a circular conical face surface comprised of a light metal;

(b) forming an insert with a circular conical bonding surface for mating with said face surface, said bonding surface being comprised of a metal dissimilar to said light metal and having a higher hardness and a higher melting temperature than said light metal of said face surface;

(c) aligning the axes of said face surface and bonding surface and gradually rotationally driving said insert into said valve seat location with sufficient pressure and for a controlled time period to frictionally melt or plasticize a film of said face surface; and (d) thereafter ceasing said rotational driving while holding said surfaces together with sufficient forging pressure and for a period of time to allow the melted film to recrystallize and create a metallurgical bond between said surfaces.

3. The method as in claim 2, in which said insert has a reduced mass in the range of 6–17 grams.

4. The method as in claim 2, in which said rotational driving of step (c) is carried out by use of gripping nubs preformed annularly about the interior of said insert.

5. The method as in claim 2, in which said face surface metal has little or no surface porosity and said bonding surface metal possesses pores.

6. The method as in claim 5, in which said face surface metal is solid wrought or cast metal and said bonding surface metal is sintered powder metal.

7. The method as in claim 2, in which said bonding surface metal is selected from the group consisting of iron and nickel alloys that have high temperature stability.

8. The method as in claim 7, in which said light metal is aluminum or an aluminum alloy.

9. The method as in claim 2, in which the pressure of step (c) is about 6,000–11,000 psi and the pressure of step (d) is about 14,000–18,000 psi.

10. The method as in claim 9, in which said step (c) is carried out for a period of 0.80–1.5 seconds, and step (d) is carried out for a period of at least 1.5 seconds.

11. The method as in claim 9, in which said insert is rotated at speed of 13–17 surface feet per second.

* * * * *